United States Patent
Inagaki et al.

(10) Patent No.: US 9,782,898 B2
(45) Date of Patent: Oct. 10, 2017

(54) ROBOT CONTROLLER FOR AVOIDING PROBLEM REGARDING ROBOT AT THE TIME OF EMERGENCY STOP

(71) Applicant: FANUC Corporation, Yamanashi (JP)

(72) Inventors: Shougo Inagaki, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/854,088

(22) Filed: Sep. 15, 2015

(65) Prior Publication Data
US 2016/0082593 A1 Mar. 24, 2016

(30) Foreign Application Priority Data
Sep. 22, 2014 (JP) .................. 2014-192948

(51) Int. Cl.
*B25J 9/16* (2006.01)
*B25J 19/06* (2006.01)

(52) U.S. Cl.
CPC ........... *B25J 9/1676* (2013.01); *B25J 9/1674* (2013.01); *B25J 19/06* (2013.01); *G05B 2219/34392* (2013.01); *G05B 2219/34394* (2013.01); *Y10S 901/09* (2013.01)

(58) Field of Classification Search
CPC ........... B25J 19/06; G05B 2219/34392; G05B 2219/34394; Y10S 901/09
USPC ............................................ 700/255; 901/9
See application file for complete search history.

(56) References Cited

U.S. PATENT DOCUMENTS

| | | | | |
|---|---|---|---|---|
| 6,298,283 | B1 * | 10/2001 | Kato | B25J 9/1676 318/16 |
| 7,868,576 | B2 * | 1/2011 | Kosaka | B60L 15/2036 318/560 |
| 2004/0260426 | A1 * | 12/2004 | Johannessen | B25J 9/1674 700/245 |
| 2006/0009878 | A1 | 1/2006 | Kobayashi et al. | |
| 2007/0086135 | A1 * | 4/2007 | Swartzendruber | H02H 3/04 361/90 |

(Continued)

FOREIGN PATENT DOCUMENTS

| | | |
|---|---|---|
| CN | 103746341 A | 4/2014 |
| JP | 63-134186 A | 6/1988 |

(Continued)

*Primary Examiner* — Khoi Tran
*Assistant Examiner* — Robert Nguyen
(74) *Attorney, Agent, or Firm* — Hauptman Ham, LLP

(57) ABSTRACT

A robot controller having a function for mitigating damage to a robot when the robot is brought to an emergency stop, and for facilitating restoration of the robot from the emergency stop. The robot controller has a controlling part which controls a motion of a robot based on a predetermined robot program; a first detecting part which detects a predetermined abnormality which does not require the robot to be immediately stopped; a stopping condition judging part which judges as to whether or not a predetermined stopping condition is satisfied when the first detecting part detects the abnormality; and a stopping process executing part which executes a stopping process of the robot when the stopping condition is satisfied, and does not execute the stopping process when the stopping condition is not satisfied.

14 Claims, 3 Drawing Sheets

(56) References Cited

U.S. PATENT DOCUMENTS

| | | | | |
|---|---|---|---|---|
| 2013/0221888 A1* | 8/2013 | Horikoshi | ............... | H02P 3/22 318/400.29 |
| 2015/0149392 A1* | 5/2015 | Bolich | ................. | G06Q 10/20 706/11 |
| 2016/0031077 A1* | 2/2016 | Inaba | .................. | B25J 9/0081 700/264 |
| 2016/0121484 A1* | 5/2016 | Ikeda | .................. | B25J 9/1633 700/256 |

FOREIGN PATENT DOCUMENTS

| | | | |
|---|---|---|---|
| JP | 5-84681 | A | 4/1993 |
| JP | 2002-292468 | A | 10/2002 |
| JP | 2004-188594 | A | 7/2004 |
| JP | 2006-012074 | A | 1/2006 |
| JP | 2009-199155 | A | 9/2009 |
| JP | 2012-504053 | A | 2/2012 |
| JP | 2013-52451 | A | 3/2013 |

* cited by examiner

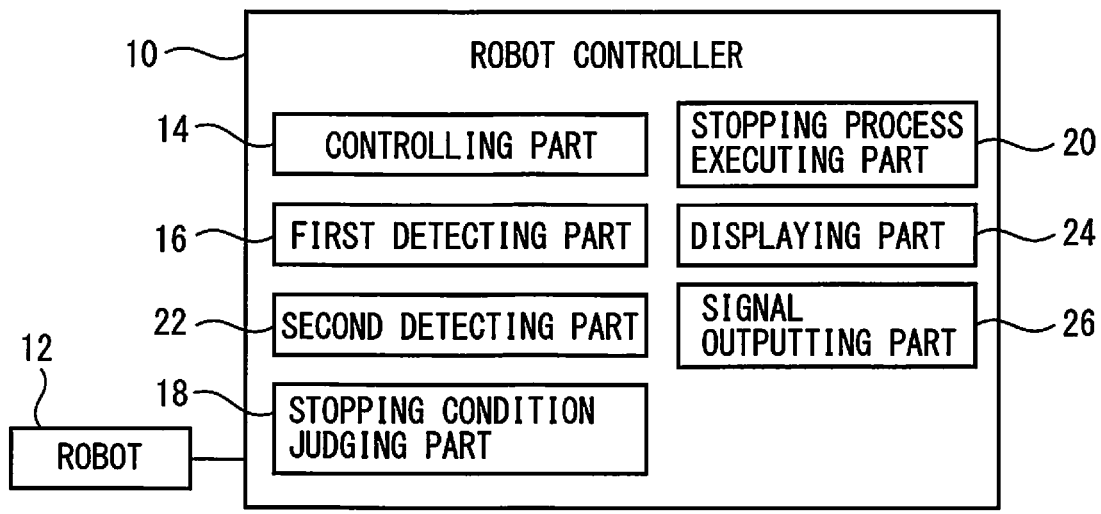
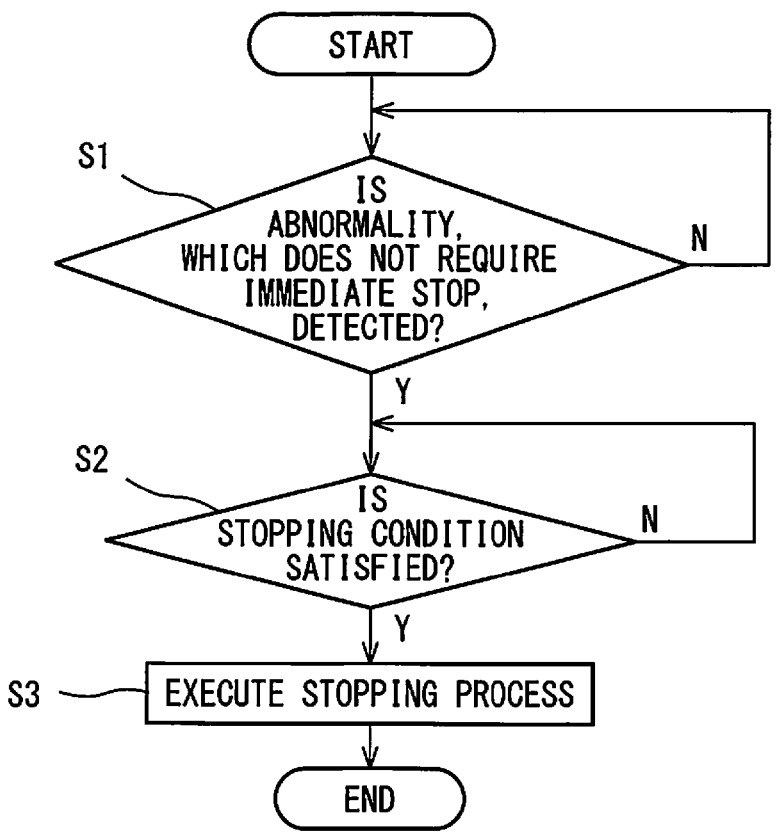

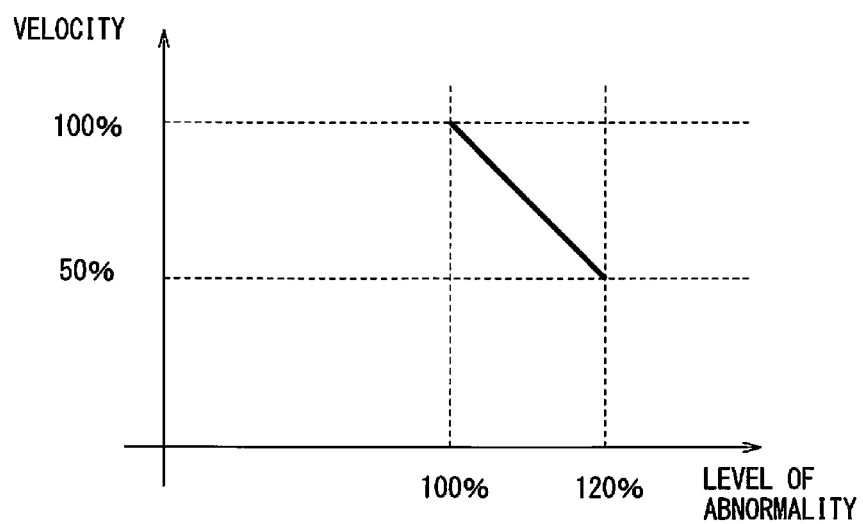

ROBOT CONTROLLER FOR AVOIDING PROBLEM REGARDING ROBOT AT THE TIME OF EMERGENCY STOP

RELATED APPLICATIONS

The present application claims priority to Japanese Application Number 2014-192948, filed Sep. 22, 2014, the disclosure of which is hereby incorporated by reference herein in its entirety.

BACKGROUND OF THE INVENTION

1. Field of the Invention

The present invention relates to a robot controller having a function for mitigating damage to a robot when the robot is brought to an emergency stop, and for facilitating restoration of the robot from the emergency stop.

2. Description of the Related Art

In general, a robot controller brings a robot to be controlled to an emergency stop, when the robot controller detects an abnormality in the robot. In this regard, when the robot is immediately stopped, an excess load may be applied to robot, whereby the robot may be damaged.

As a relevant art document, JP 2006-012074 A discloses a program generating device for safely returning a robot to a waiting position thereof, when the robot is brought to an emergency stop due to an error, etc. The document describes that the program generating device is configured to generate a program, based on layout information of the device, information transmitted to the device, teaching points in a robot program and attribute information thereof, whereby the robot can be returned from a stopping position to a waiting position without interfering with peripheral equipment.

In the technique described JP 2006-012074 A, the robot can be safely returned to the waiting position when the robot is brought to an emergency stop due to an abnormality. However, JP 2006-012074 A does not describe means for reducing a load applied to the robot at the time of emergency stop. Further, it is necessary to previously prepare layout information of the robot and an object near the robot, and check the motion of a generated returning program.

When the robot is stopped at a position on an intricate path, etc., it may be difficult to restore the robot. On the other hand, depending on the kind of abnormality (for example, when a motor for driving the robot overheats or a torque average of the motor excessively increases), it is not necessary to immediately stop the robot and it is sufficient to stop the robot after the series of operations of the robot is completed. As such, when an abnormality, which does not require the robot to be immediately stopped, is detected, it is desired that the robot is stopped at a position where the restoration after the stoppage of the robot can be easily carried out.

SUMMARY OF THE INVENTION

Thus, the object of the present invention is to provide a robot controller having a function for mitigating damage to a robot when the robot is brought to an emergency stop, and for facilitating restoration of the robot from the emergency stop.

The present invention provides a robot controller for controlling a robot, comprising: a controlling part which controls a motion of a robot; a first detecting part which detects a predetermined abnormality which does not require the robot to be immediately stopped; a stopping condition judging part which judges as to whether or not a predetermined stopping condition is satisfied when the first detecting part detects the abnormality which does not require the robot to be immediately stopped; and a stopping process executing part which executes a stopping process of the robot when the stopping condition is satisfied, and does not execute the stopping process of the robot when the stopping condition is not satisfied.

The stopping condition may be that a predetermined operation is carried out by a user, or a signal is input to the robot controller.

Alternatively, the stopping condition may be that a predetermined command is executed in a robot program.

Alternatively, the stopping condition may be that the robot reaches a designated position or region, or the robot reaches outside of a designated region.

Alternatively, the stopping condition may be that execution of a robot program is completed.

Alternatively, the stopping condition may be that a predetermined period of time has passed after the abnormality is detected.

In a preferred embodiment, the robot controller further comprises a second detecting part which detects a predetermined higher level of abnormality which is the same kind as the abnormality which does not require the robot to be immediately stopped, wherein the stopping condition is that the second detecting part detects the higher level of abnormality.

In this case, the first and second detecting parts may be configured as the same detecting part, and the abnormalities detected by the detecting part may be different only in the level of abnormality.

In a preferred embodiment, the robot controller further comprises at least one of: a displaying part which displays as to whether or not the stopping condition is satisfied; and a signal outputting part which outputs a signal representing as to whether or not the stopping condition is satisfied.

When the stopping condition is that the robot reaches to the designated position or region, or the robot reaches the outside of the designated region, the robot controller may further comprise at least one of: a displaying part which displays as to how far the robot approaches the designated position or region, or the outside of the designated region; and a signal outputting part which outputs a signal representing as to how far the robot approaches the designated position or region, or the outside of the designated region.

When the stopping condition is that a predetermined period of time has passed after the abnormality is detected, the robot controller may further comprise at least one of: a displaying part which displays a remaining time before the period of time has passed or an elapsed time after the abnormality is detected; and a signal outputting part which outputs a signal representing a remaining time before the period of time has passed or an elapsed time after the abnormality is detected.

In a preferred embodiment, the robot controller reduces a motion velocity of the robot from the time when the abnormality is detected.

In a preferred embodiment, the stopping process is: stopping the robot immediately after the stopping condition is satisfied; stopping the robot after a predetermined robot program is executed; or stopping the robot after the robot reaches a predetermined position.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 1 is a functional block diagram of a robot controller according to a preferred embodiment of the present invention;

FIG. 2 is a flowchart showing a procedure in the robot controller of FIG. 1;

FIG. 4 shows a graph explaining an example of the procedure for reducing the velocity of a robot depending on a level of detected abnormality; and FIG. 5 shows an example of a status screen which can be displayed by the displaying part of the robot controller of FIG. 1.

DETAILED DESCRIPTION

Figure 3:
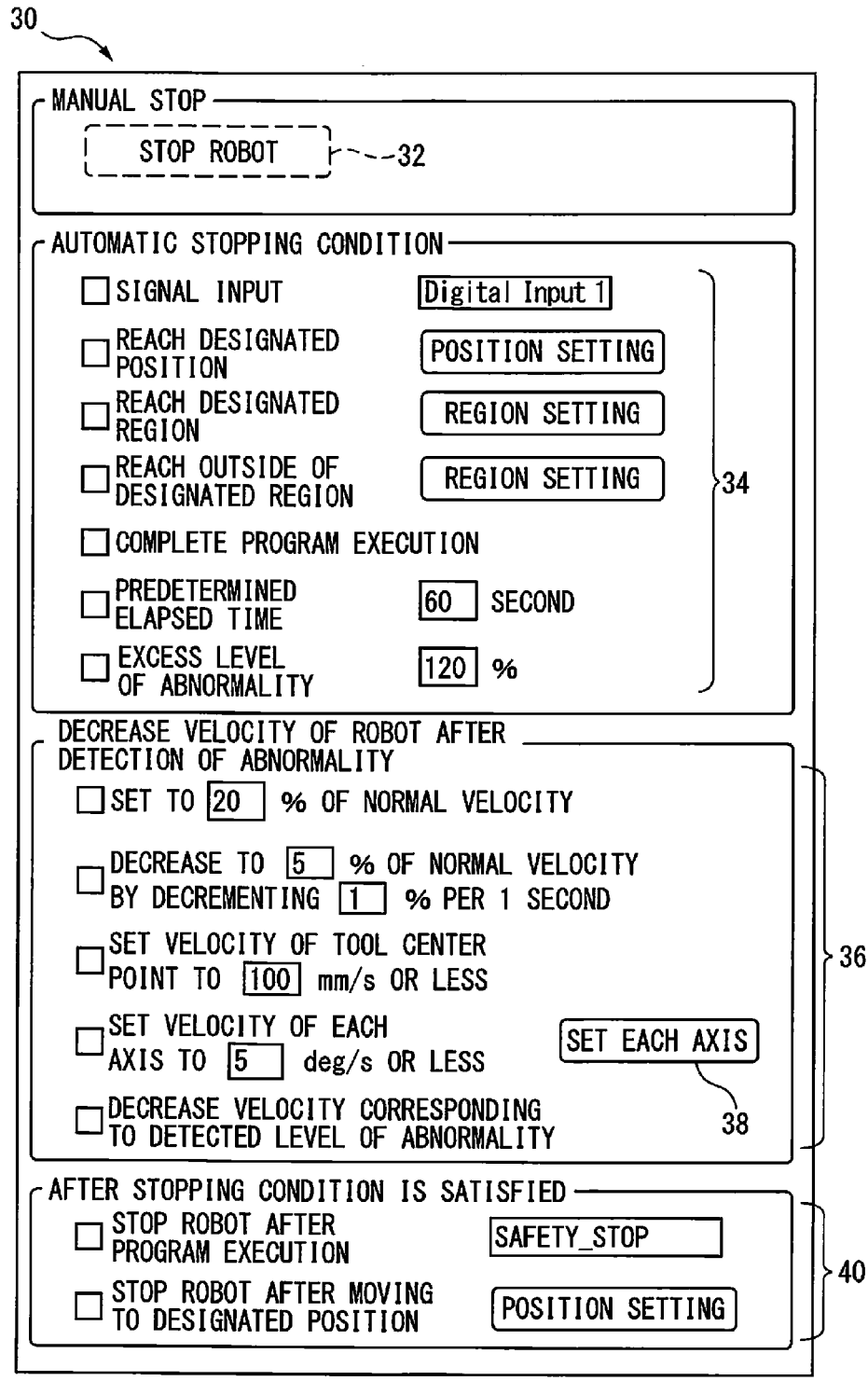
FIG. 3 shows an example of a setting screen which can be displayed by a displaying part of the robot controller of FIG. 1.

FIG. 1 is a functional block diagram of a robot controller 10 according to a preferred embodiment of the present invention. Robot controller 10 has a controlling part 14 which controls a motion of a schematically shown robot 12 (for example, a multi-joint robot having six axes), based on a predetermined robot program, etc.; a first detecting part 16 which detects a predetermined abnormality which does not require robot 12 to be immediately stopped; a stopping condition judging part 18 which judges as to whether or not a predetermined stopping condition is satisfied when first detecting part 16 detects the abnormality which does not require robot 12 to be immediately stopped; and a stopping process executing part 20 which executes a stopping process of robot 12 when the stopping condition is satisfied, and does not execute the stopping process of robot 12 when the stopping condition is not satisfied.

Further, robot controller 10 may have a second detecting part 22 which detects a predetermined higher level of abnormality which is the same kind as the abnormality which does not require the robot to be immediately stopped; a displaying part 24 which displays information as described below; and a signal outputting part 26 which outputs the information as a signal.

FIG. 2 is a flowchart showing a basic procedure in the robot controller of the present invention. When first detecting part 16 detects the abnormality which does not require robot 12 to be immediately stopped, during robot controller 10 controls robot 12 (step S1), stopping condition judging part 18 judges as to whether or not a predetermined stopping condition is satisfied (step S2). When the stopping condition is satisfied, stopping process executing part 20 executes the stopping process for stopping robot 12 (step S3). On the other hand, when the stopping condition is not satisfied, the stopping process is not executed until the stopping condition is satisfied.

In this regard, the "predetermined abnormality which does not require the robot to be immediately stopped" means, for example, overheating of a driving part such as a servomotor for driving each axis of robot 12, or a case in which an average toque of the servomotor within a certain period of time exceeds a predetermined upper limit (i.e., excess average torque), etc. In other words, even when robot 12 is not immediately stopped, there is no or very little possibility that the operator is injured or the robot is damaged by the predetermined abnormality.

The predetermined stopping condition in step S2 may be a single condition or may include a plurality of conditions. In case that the stopping condition includes a plurality of conditions, the stopping process may be executed when one of the conditions is satisfied, or when all of the conditions are satisfied, or when some predetermined conditions of the conditions are simultaneously satisfied.

As a method for executing the stopping process, each axis of the robot may be simply decelerated and stopped, or a robot program predetermined as the stopping process may be executed.

Hereinafter, a concrete example of the stopping condition will be explained with reference to FIG. 3. FIG. 3 shows an example of a user setting screen 30 capable of being displayed by displaying part 24. On setting screen 30, a user can carry out input operation by operating a button.

On setting screen 30, a button 32 is arranged for manually stopping the robot by the user. When the user pushes button 32, the stopping process of robot 12 may be executed. In this regard, button 32 may be normally inoperable (in FIG. 3, button 32 is indicated by a dashed line), may be operable when the abnormality in root 12 is detected, and may be inoperable again when the robot is stopped.

By using manual stop button 32, the user can actively stop the robot at a timing suitable for restoring operation. Although the example of the button operation (manual stop) on the setting screen by the user is explained as the example of the stopping condition in FIG. 3, the other manual stop operation, such as key-input operation of hardware, a stop command from external equipment, or a change in an environmental variable, can be used.

As indicated by reference numeral 34 in FIG. 3, an automatic stopping condition may be used as the stopping condition. In the example of FIG. 7, following seven conditions are displayed, and the user can select any condition on the setting screen so as to validate the selected condition.

(1) Signal Input
(2) (Robot) Reach(es) Designated Position
(3) (Robot) Reach(es) Designated Region
(4) (Robot) Reach(es) Outside of Designated Region
(5) Complete (Robot) Program Execution
(6) Predetermined Elapsed Time (from when abnormality is detected)
(7) Excess Level of Abnormality Regarding condition (1), as the signal input, the external equipment may be previously configured to automatically input a signal to robot controller 10 when robot 12 is in a state suitable for restoration (for example, robot 12 is returned to the waiting position).

In any of conditions (2) to (4), the stopping process is executed when the robot reaches a designated position or region, or the robot reaches an outside of a designated region. In this regard, the position or region may be designated in an each-axis form or an orthogonal form. When the each-axis form is used, the position or region may be designated with respect to only a part of the axes or all of the axes. On the other hand, when the orthogonal form is used, the position or region may be designated with respect to only one direction, or may be designated taking into consideration the orientation of a front end of a robot hand and the position of an additional axis.

An allowable error may be previously determined with respect to the designated position or the designated region. The designated region may have an arbitrary shape, and may be a closed region or an opened region. By using any of conditions (2) to (4), the robot can be stopped at a position suitable for restoration from the emergency stop.

Conditions (2) to (4) may be combined and used. For example, on setting screen 30 (automatic stopping condition 34), when conditions (2) and (3) are simultaneously selected, only a position designated in condition (2), which is included in a region designated in condition (3), may be validated. Otherwise, when conditions (2) and (4) are simultaneously selected, only a position designated in condition (2), which is not included in a region designated in condition (4), may be validated. Further, when conditions (3) and (4) are simultaneously selected, only a region, which is included in the region designated in condition (3) and is not included in the other region designated in condition (4), may be validated.

When condition (5) is selected, the stopping process for stopping the robot can be executed after the execution of the robot program is completed. For example, the stopping process may be executed when execution of one or more predetermined robot program of a plurality of robot programs is completed, or when execution of all of the plurality of robot programs is completed. By using condition (5), the robot can be prevented from being stopped at an inappropriate position during the execution of the program.

When condition (6) is selected, the stopping process for stopping the robot can be executed after a predetermined period of time (for example, 30 to 60 seconds) has elapsed from when the abnormality is detected. By using condition (6), the motion of the robot can be continued for a certain period of time even after the abnormality is detected, whereby it is possible to safely stop the robot without applying excess load to the robot.

In condition (7), the stopping process for stopping robot 12 can be executed, after first detecting part 16 detects the "predetermined abnormality which does not require the robot to be immediately stopped" and further second detecting part 22 detects that the level of the abnormality is increased. For example, the stopping process can be executed after first detecting part 16 detects that the velocity of an axis of robot 12 exceeds an upper limit (100%), and further second detecting part 22 detects that the velocity of the axis reaches 120% of the upper limit.

When the kind of the abnormality is overheat, the level of the abnormality can be detected by the same temperature sensor, by setting a plurality of thresholds. As such, when only the level of the abnormality is different between first and second detecting parts 16 and 22, the detecting parts may be the same device, whereby a cost thereof may be reduced. First and second detecting parts 16 and 22 may be different temperature sensors, or at least of the detecting parts may be software capable of executing a heat simulation.

As indicated by reference numeral 36 in FIG. 3, on setting screen 30, various settings (inputs) can be carried out for decreasing the velocity of robot 12 from when the abnormality is detected, whereby the robot can be protected from the abnormality. In the drawing, five velocity relaxation items are exemplified, and any item can be validated by being selected by the user on the setting screen.

(A) Set to [ ]% of Normal Velocity
(B) Decrease to [ ]% of Normal Velocity by Decrementing [ ]% per 1 Second
(C) Set Velocity of Tool Center Point to [ ] mm/s or less
(D) Set Velocity of Each Axis to [ ] deg/s or less
(E) Decrease Velocity Corresponding to Detected Level of Abnormality In items (A), (C) and (D), the motion velocity may be decreased discontinuously or gradually. In item (B), the velocity may be set to [ ]% of the normal velocity as shown in the drawing, or may be set to a velocity or less which is designated by the user. In item (D), as exemplified by an operation button 38, the velocity may be set with respect to each axis. In addition, items (A) to (E) may be combined and used as long as there is no inconsistency in the combination.

In item (E), there may be provided a means to consecutively monitor the level of the detected abnormality. For example, when the detected abnormality is overheat, the temperature sensor may be used to consecutively monitor the temperature of the object, and the monitored temperature may be used for judging the stopping condition. Concretely, the normal temperature or atmosphere temperature may be previously measured, and the difference between the normal temperature or atmosphere temperature and the current temperature or atmosphere temperature is calculated as a percentage, assuming the threshold of first detecting part 16 is defined as 100%, and then the calculated value may be consecutively monitored.

FIG. 4 explains an example of item (E), in which the velocity of the robot is decreased corresponding to the detected level of abnormality. First, the level of abnormality when the temperature of the robot reaches the threshold regarding first detecting part 16 is defined as 100%, and the velocity of the robot at the same time is set to a value from zero to 100% (in the drawing, 100%) of the normal time. Then, as the temperature of the robot increases (or the level of abnormality (overheat) increases), the velocity of the robot is gradually decreased. In the drawing, when the level of abnormality is changed from 100% to 120%, the velocity of the robot is decreased from 100% to 50% in a linear function manner. Although it is not necessary that the velocity is decreased in a linear function manner, it is preferable that the velocity be decreased monotonically or step-by-step.

The velocity relaxation corresponding to the level of abnormality, as exemplified in FIG. 4, may be set with respect to a plurality of parameters (for example, the temperature and torque average of the motor). In this case, it is preferable that, among the velocities calculated corresponding to the level of abnormality of each selected parameter, the lowest velocity be set. Otherwise, a priority order may be predetermined with respect to each parameter, and the level of abnormality regarding only one parameter having the highest priority may be validated.

After the above stopping condition is satisfied, the robot may be immediately stopped. Alternatively, the robot may be stopped after the predetermined robot program is executed, or after the robot is moved to a predetermined position. For example, as indicated by reference numeral 40 in FIG. 3, two options may be provided so that the user can select and validate the option.

(a) Set to [ ]% of Normal Velocity
(b) Decrease to [ ]% of Normal Velocity by Decrementing [ ]% per 1 Second In the example of FIG. 3, it is preferable that either of option (a) or (b) can be selected. When neither of the options is selected, the robot is stopped on the spot immediately when the stopping condition is satisfied. In this regard, the "robot program" herein may not include the motion of the robot.

As shown in FIG. 5, displaying part 24 can display a status screen 42 as well as setting screen 30 as described above. After the stopping condition is satisfied, status screen 42 can indicate as to what kind of stopping condition is satisfied.

In the example of FIG. 5, status screen 42 displays seven conditions corresponding to automatic stopping condition 34 on setting screen 30, and indicates that the satisfied condition is item (3), i.e., "Reach Designated Region." In this case, regarding conditions (2) to (4), the (minimum)

remaining distance toward the designated position or region may be indicated as a value. Alternatively or additionally, the current position of the robot and the designated position or region may be graphically indicated.

Regarding condition (6), the remaining time before the predetermined period of time has passed may be indicated, or an elapsed time after the abnormality is detected may be indicated. Due to such function, the user can easily and quantitatively obtain and understand the difference between the current condition and the stopping condition. Further, the user can utilize the obtained information for judging the timing of the manual stopping (or the operation of button 32) on setting screen 30.

In the example of FIG. 5, as the "status" of the robot, one of "abnormality is not detected," "abnormality is detected" and "stopping is complete" may be displayed (in the illustrated example, "stopping is complete" is displayed). Various information, displayed on status screen 42, may be output by signal outputting part 26 as a signal to the other external equipment, etc. By virtue of this, the information can be displayed on or checked in the external equipment.

Hereinafter, an example of operation in the robot controller using setting screen 30 of FIG. 3 will be explained. First, the user carries out setting on setting screen 30 so as to execute the robot program.

When the abnormality such as overheat, which does not require the robot to be immediately stopped, is detected during the execution of the robot program, the robot is not immediately stopped. At this point, when any item in "DECREASE VELOCITY OF ROBOT AFTER DETECTION OF ABNORMALITY" indicated by reference numeral 36 is set or validated, the velocity of the robot is decreased according to the setting of the item.

However, when any of following items (I) to (III) is true after the abnormality is detected, the stopping process of the robot is executed. In this regard, when option 40 is selected, the selected option is preferentially executed as the stopping process.

(I) "Stop Robot" button 32 is pushed
(II) Any of items predetermined in automatic stopping condition 34 is satisfied
(III) Given command taught in robot program is executed Regarding item (III), by teaching the command in an arbitrary line in the program, the robot can be stopped at the timing suitable for the restoration of the robot.

Although the dedicated screen such as setting screen 30 or status screen 42 is used to display the information, etc., in the above examples, the present invention is not limited to as such. For example, an alarm generated when the stopping process is executed may be displayed as a character string. Further, as a displaying device, a teaching pendant, an external operation panel, a personal computer, a smartphone, or a tablet may be used, as well as the displaying part of the robot controller.

According to the present invention, even when the robot is to be brought to an emergency stop due to a detected abnormality, the robot may continue to move without being immediately stopped, when the detected abnormality does not require the robot to be immediately stopped. Therefore, an excess load can be prevented from being applied to the robot.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot controller for controlling a robot, the robot controller comprising:
   at least one first detector configured to detect overheating of a driving part for driving the robot, wherein the overheating represents a predetermined abnormality which does not require the robot to be immediately stopped; and
   a processor configured to:
   control a motion of the robot;
   judge whether or not a predetermined stopping condition is satisfied when the at least one first detector detects the overheating of the driving part;
   execute a stopping process of the robot when the stopping condition is satisfied; and
   not execute the stopping process of the robot when the stopping condition is not satisfied.

2. The robot controller as set forth in claim 1, wherein the stopping condition is that a predetermined operation is carried out by a user, or a signal is input to the robot controller.

3. The robot controller as set forth in claim 1, wherein the stopping condition is that a predetermined period of time has passed since the overheating of the driving part is detected.

4. The robot controller as set forth in claim 1, wherein the processor is further configured to cause at least one selected from the group consisting of:
   displaying, on a display, whether or not the stopping condition is satisfied, and
   outputting a signal representing whether or not the stopping condition is satisfied.

5. The robot controller as set forth in claim 1, wherein the processor is further configured to reduce a motion velocity of the robot from the time when the overheating of the driving part is detected.

6. The robot controller as set forth in claim 1, wherein the stopping process includes at least one selected from the group consisting of:
   stopping the robot immediately after the stopping condition is satisfied,
   stopping the robot after a predetermined robot program is executed, and
   stopping the robot after the robot reaches a predetermined position.

7. The robot controller as set forth in claim 1, wherein the at least one detector includes a temperature sensor.

8. A robot controller for controlling a robot, the robot controller comprising:
   at least one first detector configured to detect overheating or excess average torque of a driving part for driving the robot, wherein the overheating or the excess average torque represents a predetermined abnormality which does not require the robot to be immediately stopped; and
   a processor configured to:
   control a motion of the robot;
   judge whether or not a predetermined stopping condition is satisfied when the at least one first detector detects the overheating or the excess average torque of the driving part;
   execute a stopping process of the robot when the stopping condition is satisfied; and
   not execute the stopping process of the robot when the stopping condition is not satisfied,
   wherein the stopping condition is that a predetermined command is executed in a robot program.

9. A robot controller for controlling a robot, the robot controller comprising:

at least one first detector configured to detect overheating or excess average torque of a driving part for driving the robot, wherein the overheating or the excess average torque represents a predetermined abnormality which does not require the robot to be immediately stopped; and a processor configured to:
- control a motion of the robot;
- judge whether or not a predetermined stopping condition is satisfied when the at least one first detector detects the overheating or the excess average torque of the driving part;
- execute a stopping process of the robot when the stopping condition is satisfied; and
- not execute the stopping process of the robot when the stopping condition is not satisfied,
- wherein the stopping condition is that the robot reaches a designated position or region, or the robot reaches outside of a designated region.

10. The robot controller as set forth in claim 9, wherein the processor is further configured to cause at least one selected from the group consisting of:
- displaying, on a display, how far the robot approaches the designated position or region, or the outside of the designated region, and
- outputting a signal representing how far the robot approaches the designated position or region, or the outside of the designated region.

11. A robot controller for controlling a robot, the robot controller comprising:
at least one first detector configured to detect overheating or excess average torque of a driving part for driving the robot, wherein the overheating or the excess average torque represents a predetermined abnormality which does not require the robot to be immediately stopped; and
a processor configured to:
- control a motion of the robot;
- judge whether or not a predetermined stopping condition is satisfied when the at least one first detector detects the overheating or the excess average torque of the driving part;
- execute a stopping process of the robot when the stopping condition is satisfied; and
- not execute the stopping process of the robot when the stopping condition is not satisfied,
- wherein the stopping condition is that execution of a robot program is completed.

12. A robot controller for controlling a robot, the robot controller comprising:
at least one first detector configured to detect overheating or excess average torque of a driving part for driving the robot, wherein the overheating or the excess average torque represents a predetermined abnormality which does not require the robot to be immediately stopped;

a processor configured to:
- control a motion of the robot;
- judge whether or not a predetermined stopping condition is satisfied when the at least one first detector detects the overheating or the excess average torque of the driving part;
- execute a stopping process of the robot when the stopping condition is satisfied; and
- not execute the stopping process of the robot when the stopping condition is not satisfied; and
at least one second detector configured to detect a higher level of the overheating or the excess average torque of the driving part than a level of the overheating or the excess average torque of the driving part detected by the at least one first detector,
wherein the stopping condition is that the at least one second detector detects the higher level of the overheating or the excess average torque of the driving part.

13. The robot controller as set forth in claim 12, wherein the at least one first detector and the at least one second detector are configured as the same detector, and the overheating or the excess average torque of the driving part detected by the same detector for detecting the abnormality and for detecting the stopping condition is different only in the level of the overheating or the excess average torque of the driving part.

14. A robot controller for controlling a robot, the robot controller comprising:
at least one first detector configured to detect overheating or excess average torque of a driving part for driving the robot, wherein the overheating or the excess average torque represents a predetermined abnormality which does not require the robot to be immediately stopped; and
a processor configured to:
- control a motion of the robot;
- judge whether or not a predetermined stopping condition is satisfied when the at least one first detector detects the overheating or the excess average torque of the driving part;
- execute a stopping process of the robot when the stopping condition is satisfied; and
- not execute the stopping process of the robot when the stopping condition is not satisfied,
- wherein the stopping condition is that a predetermined period of time has passed since the overheating or the excess average torque of the driving part is detected, and
- wherein the processor is further configured to cause at least one selected from the group consisting of:
  - displaying, on a display, a remaining time before the period of time is elapsed or an elapsed time since the overheating or the excess average torque of the driving part is detected, and
  - outputting a signal representing a remaining time before the period of time is elapsed or an elapsed time since the overheating or the excess average torque of the driving part is detected.

* * * * *